(12) United States Patent
Kersten

(10) Patent No.: US 10,815,656 B2
(45) Date of Patent: Oct. 27, 2020

(54) CONNECTING ELEMENT AND METHODS FOR CONNECTING PARTIAL RING SEGMENTS

(71) Applicant: Wobben Properties GmbH, Aurich (DE)

(72) Inventor: Roy Kersten, Hohenwarthe (DE)

(73) Assignee: Wobben Properties GmbH, Aurich (DE)

( * ) Notice: Subject to any disclaimer, the term of this patent is extended or adjusted under 35 U.S.C. 154(b) by 98 days.

(21) Appl. No.: 16/091,916

(22) PCT Filed: Apr. 3, 2017

(86) PCT No.: PCT/EP2017/057805
§ 371 (c)(1),
(2) Date: Oct. 5, 2018

(87) PCT Pub. No.: WO2017/174480
PCT Pub. Date: Oct. 12, 2017

(65) Prior Publication Data
US 2019/0119907 A1 Apr. 25, 2019

(30) Foreign Application Priority Data
Apr. 8, 2016 (DE) .................. 10 2016 106 526

(51) Int. Cl.
*E04H 12/12* (2006.01)
*E04B 1/41* (2006.01)
(Continued)

(52) U.S. Cl.
CPC .............. *E04B 1/41* (2013.01); *E04B 1/215* (2013.01); *E04H 5/02* (2013.01); *E04H 12/12* (2013.01);
(Continued)

(58) Field of Classification Search
CPC ... E04B 1/043; E04B 1/41; E04B 1/43; E04B 1/215; E04B 2001/1933; E04H 5/02;
(Continued)

(56) References Cited

U.S. PATENT DOCUMENTS 2,273,775 A * 2/1942 Strong ................... E04C 2/384
52/405.1
3,785,097 A * 1/1974 Seymour ................. E04B 1/215
52/126.7
(Continued)

FOREIGN PATENT DOCUMENTS

DE 2116538 A1 2/1973
DE 7730563 U1 2/1979
(Continued)

*Primary Examiner* — Joshua J Michener
*Assistant Examiner* — James J Buckle, Jr.
(74) *Attorney, Agent, or Firm* — Seed Intellectual Property Law Group LLP

(57) ABSTRACT

A connecting element for inserting into a wind power installation tower segment. A wind power installation tower section and a wind power installation tower. A wind power installation and methods for connecting partial ring segments. The connecting element comprises a first side wall with a first opening which can be penetrated by a fastening element, and a second side wall lying opposite the first side wall with a second opening which can be penetrated by a fastening element, an upper transverse wall with two upper openings which can each be penetrated by a mounting fastening element, and a lower transverse wall lying opposite the upper transverse wall with two lower openings which can each be penetrated by a mounting fastening element; wherein the upper and lower transverse wall are arranged substantially orthogonally to the first and second side wall and connect said side walls.

15 Claims, 12 Drawing Sheets

(51) Int. Cl.
  *F03D 13/20* (2016.01)
  *E04B 1/21* (2006.01)
  *E04H 5/02* (2006.01)

(52) U.S. Cl.
  CPC .......... *F03D 13/20* (2016.05); *F05B 2230/50* (2013.01); *F05B 2230/60* (2013.01); *F05B 2240/40* (2013.01); *F05B 2260/30* (2013.01); *F05B 2260/301* (2013.01); *Y02E 10/728* (2013.01); *Y02P 70/523* (2015.11)

(58) Field of Classification Search
  CPC ........ E04H 12/12; E04H 12/16; F03D 13/20; F05B 2230/50; F05B 2230/60; F05B 2240/40; F05B 2260/30; F05B 2260/301; Y02E 10/728; Y02P 70/523
  USPC .................................................. 52/583.1, 698
  See application file for complete search history.

(56) References Cited

U.S. PATENT DOCUMENTS

| | | | | |
|---|---|---|---|---|
| 4,271,654 | A * | 6/1981 | Jungbluth | E04B 1/1912 |
| | | | | 52/637 |
| 4,484,430 | A * | 11/1984 | Rossman | E04B 1/1909 |
| | | | | 403/174 |
| 4,589,666 | A | 5/1986 | Halling | |
| 4,781,006 | A * | 11/1988 | Haynes | E04B 1/215 |
| | | | | 52/583.1 |
| 5,410,847 | A * | 5/1995 | Okawa | E04B 1/30 |
| | | | | 403/346 |
| 7,739,843 | B2 | 6/2010 | Cortina-Cordero | |
| 7,975,444 | B2 * | 7/2011 | Holdsworth | E04B 1/043 |
| | | | | 403/296 |
| 8,234,837 | B2 * | 8/2012 | Koren | E04C 3/30 |
| | | | | 138/157 |
| 8,256,174 | B2 | 9/2012 | Irniger et al. | |
| 9,151,034 | B2 * | 10/2015 | Jaeschke | E04B 1/4114 |
| 9,163,613 | B2 * | 10/2015 | Martinez de Castaneda | |
| | | | | E04H 12/16 |
| 9,951,513 | B2 * | 4/2018 | Ladret | E04B 1/043 |
| 10,400,438 | B2 * | 9/2019 | Calderon Uriszar-Aldaca | |
| | | | | E04C 5/165 |
| 10,538,936 | B2 * | 1/2020 | Knitl | F03D 13/20 |
| 2003/0110715 | A1 * | 6/2003 | Hansort | B66C 1/66 |
| | | | | 52/125.6 |
| 2004/0149951 | A1 * | 8/2004 | Gethmann | F16K 31/44 |
| | | | | 251/291 |
| 2009/0025304 | A1 * | 1/2009 | Irniger | E04H 12/16 |
| | | | | 52/40 |
| 2009/0094915 | A1 * | 4/2009 | Liberman | E04B 1/043 |
| | | | | 52/293.3 |
| 2013/0025229 | A1 | 1/2013 | Kapitza et al. | |
| 2013/0036700 | A1 * | 2/2013 | Speer | E04B 2/16 |
| | | | | 52/583.1 |
| 2013/0333318 | A1 * | 12/2013 | Clear | E04B 1/4121 |
| | | | | 52/583.1 |
| 2014/0013699 | A1 * | 1/2014 | Gallinat | E04C 5/125 |
| | | | | 52/583.1 |

FOREIGN PATENT DOCUMENTS

| | | |
|---|---|---|
| DE | 8503887 U1 | 5/1985 |
| DE | 29809541 U1 | 10/1999 |
| DE | 10247388 A1 | 4/2004 |
| DE | 102008055607 A1 | 5/2009 |
| JP | H03206222 A | 9/1991 |
| JP | H04-069504 U | 6/1992 |
| JP | 7009928 Y2 | 3/1995 |
| JP | 2009-509072 A | 3/2009 |
| JP | 2013-518210 A | 5/2013 |
| KR | 10-2012-0127473 A | 11/2012 |
| RU | 2327056 C2 | 6/2008 |
| WO | 03012335 A1 | 2/2003 |

* cited by examiner

CONNECTING ELEMENT AND METHODS FOR CONNECTING PARTIAL RING SEGMENTS

BACKGROUND

Technical Field

The invention relates to a connecting element for inserting into a wind power installation tower section. The invention furthermore relates to a wind power installation tower section and to a wind power installation tower. Moreover, the invention relates to a wind power installation and to methods for connecting partial ring segments.

Description of the Related Art

A wind power installation essentially comprises a rotor, comprising at least one rotor blade which is moved in a rotational manner by an airflow and therefore drives a generator by means of a blade wheel, wherein the generator is generally arranged within a nacelle. The nacelle is preferably arranged on a tower which is designed either as a steel tower or as a concrete tower, comprising or composed of reinforced concrete and/or prestressed concrete. A concrete tower is in particular a tower which is predominantly manufactured from concrete, wherein, however, sections can also be produced from a different material, preferably steel. A tower of this type preferably has a tubular geometry, wherein the diameter of the tower decreases along its longitudinal extent toward the nacelle. The diameter of a wind power installation tower can occasionally exceed 8 meters. A cross section of the tower, orthogonally to the longitudinal extent of the tower, can be round or polygonal, preferably octagonal. If annular designs are referred to below, these preferably comprise both round and also polygonal cross sections of the tower.

The tower generally comprises a number of wind power installation tower sections having an annular geometry with a defined height. The annularly formed wall furthermore has a thickness. The wind power installation tower sections are preferably arranged on one another along the longitudinal extent of the tower in such a manner that the end surfaces lie substantially completely against one another.

The wind power installation tower sections frequently comprise a plurality of partial ring segments in order, inter alia, to simplify the transport, in particular the delivery of the wind power installation tower sections to the erection site of the wind power installation, by means of components having a smaller size. In particular, this relates to the wind power installation tower sections which are arranged in the lower region of the tower. A wind power installation tower section can be assembled, for example, from two partial ring segments which, for example, each form a 180 arc degree segment of the wind power installation tower section. Said partial ring segments are preferably industrially premanufactured in the form of precast concrete parts and, for the construction of the tower, are assembled at the erection site of the wind power installation and connected to one another.

The partial ring segments are assembled in such a manner that they form the annular wind power installation tower section. When two segments are used, two vertically running separating joins arise because of the assembly. The separating joins arise at the point at which the partial ring segments butt against each other with their respective two butting edges. In the case of known partial ring segments, generally parts of the reinforcement and/or connecting elements partially protrude at said butting edges so that the partial ring segments can be connected to one another here. The connection preferably takes place by means of a catch which connects the reinforcement of a partial ring segment, said reinforcement protruding from a first butting edge, to the reinforcement of a further partial ring segment, said reinforcement protruding from a second butting edge. The remaining vertical join is generally subsequently mortared.

It is disadvantageous in this connection that this is associated with a high outlay both in the production of the partial ring segments and in the connection of the partial ring segments. In addition, this type of connection conceals the risk of corrosion of the reinforcing sections or connecting sections in this region, which corrosion can occur even when the connection is carefully implemented. In addition, the achievable positioning accuracy of the partial ring segments with respect to one another is limited and customarily lies within the range of approximately ±10 mm. Furthermore, for example, the mortaring may be problematic at low temperatures.

Overall, connections, in particular screw connections, for such joints or the joins arising here are generally subject to exacting requirements and, due to the latter, to generally short maintenance intervals which, because of being intensive in terms of personnel to carry out, are associated with high costs.

In the priority application for the present application, the German Patent and Trademark Office has searched the following prior art: WO 2003/012 335 A1, DE 85 03 887 U1, DE 10 2008 055 607 A1 and DE 298 09 541 U1.

BRIEF SUMMARY

Provided is a connecting element and a method for connecting two partial ring segments, and also a wind power installation tower section, a wind power installation tower and a wind power installation which reduce or eliminate one or more of the abovementioned disadvantages. In particular, provided is a connecting element and a method for connecting two partial ring segments, and also a wind power installation tower section, a wind power installation tower and a wind power installation which reduce the maintenance intensity of the connection of partial ring segments for wind power installation towers. Furthermore, provided is a connecting element and a method for connecting at least two partial ring segments, and also a wind power installation tower section, a wind power installation tower and a wind power installation which permit a connection of partial ring segments for wind power installation towers, which connection is simple to produce and/or is cost-effective.

According to a first aspect of the invention, an object is achieved by a connecting element for inserting into a wind power installation tower section, comprising a first side wall with at least one first opening which can be penetrated by a fastening element, and a second side wall lying opposite the first side wall with at least one second opening which can be penetrated by a fastening element, an upper transverse wall and a lower transverse wall lying opposite the upper transverse wall; wherein the upper and lower transverse wall are arranged substantially orthogonally to the first and second side wall and connect said side walls.

The invention is based on the finding that the force ratios in connections of partial ring segments have a substantial influence on the necessary maintenance intensity. A low maintenance intensity is distinguished inter alia in that the connection, in particular a screw connection, has to be checked only very rarely, that is to say after a great many operating hours. In particular, screw connections only have to be tightened after very many operating hours, with low maintenance intensity. In the event of a configuration of the connection in such a manner that the forces run substantially or exclusively in the axial direction of a connecting element and the connecting element is predominantly subjected to a tensile load and in particular shearing stresses can be reduced, a significantly reduced maintenance intensity is provided. This is true in particular of screw connections, wherein the screw is then predominantly or exclusively subjected to a tensile load axially, in particular in the operating state.

The wind power installation tower section, into which the connecting element according to the invention is inserted, is provided for the construction of a tower of a wind power installation. The wind power installation tower section preferably has an annular geometry, and therefore said wind power installation tower section is essentially formed by an outer circumferential surface, an inner circumferential surface and two end sides. The wind power installation tower sections are placed against each other or on each other on their end sides, and therefore the tower of a wind power installation is constructed. The end sides of the wind power installation tower section can comprise steps which simplify the positioning of the tower sections against each other or on each other. The tower sections are preferably composed of or comprise concrete, in particular reinforced concrete or prestressed concrete.

The first and/or second side wall of the connecting element preferably each has a substantially flat geometry which is formed by a horizontal extent and a vertical extent running orthogonally to the latter. Furthermore, the side walls have a thickness which is directed orthogonally to the horizontal extent and to the vertical extent and preferably has a very small dimension in comparison to the dimensions of the horizontal extent and the vertical extent. The side walls here preferably have a predominantly plane surface. Furthermore preferably, the side walls have a concave surface in sections or completely, for example in order to achieve pretensioning of a fastening element guided through the side walls. The thickness of the side walls can have a continuous dimension, wherein furthermore a thickening or tapering at regions subjected to a correspondingly higher and lower load can also be provided. Furthermore, there is the possibility of the side walls having recesses and/or ribbed structures.

The first side wall and the second side wall preferably each have the same dimensions for their horizontal extent and for their vertical extent, and therefore the flat extent of the first side wall has the same area as the flat extent of the second side wall. For specific applications, a deviation can also be made from the previously described, preferred variant embodiment, and therefore the area of the flat extent of the first side wall is unequal to the area of the flat extent of the second side wall. Furthermore, the dimensions of the first side wall and of the second side wall can differ in respect of their horizontal extent and/or their vertical extent. In a preferred variant of the connecting element, the two side walls have the same dimension in respect of the thickness.

The side walls of the connecting element are located in such a manner that the first side wall is arranged lying opposite the second side wall. Accordingly, the side walls are arranged opposite each other and, furthermore, are spaced apart from each other. The first side wall and the second side wall are preferably arranged in a surface-parallel manner to each other, and therefore their respective surface normals run substantially parallel. Furthermore preferably, the two side walls are arranged in such a manner that the surface normal of one side wall is directed toward the flat extent of the other side wall.

The first side wall has a first opening which can be penetrated by a fastening means, and the second side wall has a second opening which can be penetrated by a fastening element. The first and/or second opening preferably has a circular cross section, wherein any other round cross sections are also possible. The cross section of the opening is in particular a cross section which runs in a surface-parallel manner to the flat extent of the first and/or second side wall. Furthermore, the first and/or second opening can also have a polygonal cross section, wherein triangular and/or square cross sections are particularly preferred. Furthermore, the opening can have an elongate extent. The penetration direction of the first and/or second opening is preferably parallel to a surface normal of the first and/or second side wall.

Furthermore, variant embodiments are possible in which the side walls each have two, three or more openings. For example, the first side wall can have two, three or more first openings and/or the second side wall can have two, three or more second openings. The openings in the first and/or second side wall, in particular the center points of the openings, can be spaced apart from one another in the vertical direction and/or in the horizontal direction. In particular, it is preferred that the openings, in particular the center points thereof, are spaced apart from one another in a direction which runs parallel to a surface orthogonal of one of the transverse walls.

The upper transverse wall and/or lower transverse wall in each case has a substantially flat geometry which is formed in each case by a first horizontal extent and a second horizontal extent running orthogonally with respect thereto. Furthermore, the transverse walls have a thickness which is directed orthogonally to the first horizontal extent and to the second horizontal extent and preferably has a very small dimension in comparison to the dimensions of the first horizontal extent and the second horizontal extent.

The transverse walls here preferably have a predominantly plane surface. Furthermore preferably, the transverse walls have a curvature in sections or completely, for example in order to achieve pretensioning of a mounting fastening element guided through the transverse walls. The thickness of the transverse walls can have a continuous dimension, wherein furthermore a thickening or tapering can also be provided at regions subjected to a correspondingly higher and lower load. Furthermore, there is the possibility of the transverse walls having recesses and/or ribbed structures.

The upper transverse wall and/or the lower transverse wall preferably each have the same dimensions for their first horizontal extent and for their second horizontal extent, and therefore the flat extent of the upper transverse wall has the same area as the flat extent of the lower transverse wall. For specific applications, a deviation can also be made from the previously described, preferred variant embodiment, and therefore the area of the flat extent of the upper transverse wall is unequal to the area of the flat extent of the lower transverse wall. In a preferred variant of the connecting element, the two transverse walls have the same dimension in respect of the thickness. The upper transverse wall and the lower transverse wall lie opposite each other, and therefore they are spaced apart from each other and the surface normals of the upper and lower transverse wall, which surface normals each run through the center point of the flat extent of the transverse walls, have substantially the same axis.

The upper and lower transverse wall is in each case arranged substantially orthogonally to the first and second side wall. The horizontal extent and/or the vertical extent of the side walls can be smaller than, equal to or greater than the horizontal extent and/or the vertical extent of the transverse walls. Furthermore, the upper transverse wall connects the first and the second side wall, and the lower transverse wall likewise connects the first and the second side wall. The connection of the transverse walls to the side walls can be realized in different ways. Particularly preferred is the configuration of the connecting element as an assembly, wherein the two transverse walls and the two side walls are arranged and connected. The two transverse walls and the two side walls are preferably connected to each other by welding and/or they are riveted to each other and/or screwed to each other. In principle, a wide variety of releasable and non-releasable connections are suitable for the connection.

Furthermore, there is the possibility of providing the connecting element completely or substantially completely integrally. This can be made possible, for example, by the connecting element being designed as a deforming and/or cutting component. Furthermore, there is the possibility of realizing the connecting element as a cast part or as a component which is to be produced generatively.

In a preferred variant embodiment of the connecting element, the upper transverse wall has at least two upper openings which can each be penetrated by a mounting fastening element, and the lower transverse wall has at least two lower openings which can each be penetrated by a mounting fastening element.

Preferably, in this embodiment, the upper transverse wall has a first upper opening which can be penetrated by a mounting fastening element, and a second upper opening which can be penetrated by a mounting fastening element, and the lower transverse wall has a first lower opening which can be penetrated by a mounting fastening element, and a second lower opening which can be penetrated by a mounting fastening element.

The upper and/or lower openings preferably have a circular cross section, wherein any other round cross sections are also possible. The cross section of the opening is in particular a cross section which runs in a surface-parallel manner to the flat extent of the upper and/or lower transverse wall. Furthermore, the upper and/or lower opening can also have a polygonal cross section, wherein triangular and/or square cross sections are particularly preferred. Furthermore, the openings can have an elongate extent. The penetration direction of the upper and/or lower opening is preferably substantially parallel to a surface normal of the upper and/or lower transverse wall. Furthermore, the upper openings can each differ from one another. Furthermore again, the lower openings can each differ from one another.

Furthermore, variant embodiments are possible in which the transverse walls each have two, three or more openings. For example, the upper transverse wall can have two, three or more upper openings and/or the lower transverse wall can have two, three or more lower openings. The upper and/or lower openings in the upper and/or lower transverse wall, in particular the center points of the openings, can be spaced apart in the longitudinal direction of one of the transverse walls and/or can be spaced apart in an orthogonal direction to said longitudinal direction. In particular, it is preferred that the openings, in particular the center points thereof, are spaced apart from one another in a direction which runs parallel to a surface orthogonal of one of the side walls.

For this purpose, the openings, in particular the at least first and second opening and the upper and lower openings, are designed to be penetrated by fastening elements and/or mounting fastening elements. Said openings are therefore designed in such a manner that a fastening element and/or mounting fastening element can pass partially or completely from one side of the side wall and/or transverse wall to the other side of the same side wall and/or the same transverse wall by passing through the opening. Releasable connecting elements, such as, for example, screws, nuts, bolts and/or pins, are preferably suitable as fastening elements or mounting fastening elements, wherein non-releasable connecting elements can also be considered for specific applications.

A further preferred variant embodiment provides a partition which is substantially parallel to the first and second side wall and is arranged between said side walls and is arranged substantially orthogonally to the lower and upper transverse wall. The partition is accordingly substantially surface-parallel to the first and second side wall. The partition is preferably spaced apart from the first and/or the second side wall, wherein an imaginary connecting line between the first and second side wall likewise passes through the partition since the partition is arranged between the first and second side wall. Furthermore, the partition is arranged substantially orthogonally to the upper and lower transverse wall, and therefore a substantially right angle, or an angle of approximately 90 arc degrees, arises at the connecting point of the partition with the upper transverse wall. The same applies to the connecting point of the partition with the lower transverse wall.

The partition can be designed as a continuous plate or with passage openings. Passage openings can arise by means of introduced bores or by the fact that the partition, for example, has recesses and/or ribbed structures. The material of the partition can comprise the same material or can be composed of the same material as the side walls and/or the transverse walls.

In a further preferred refinement, the connecting element with the partition comprises a first partial connecting element without a partition and/or a second partial connecting element without a partition, wherein preferably the first partial connecting element is arranged with one of its side walls on a side wall of the second partial connecting element. The connection between said partial connecting elements can take place, for example, by means of a screw connection since openings are provided on the side walls. The connecting element can therefore be constructed modularly and can be assembled from partial connecting elements, which can simplify the production of the connecting element.

In a particularly preferred embodiment of the connecting element, the latter is characterized in that the partition divides the upper and lower transverse wall in each case, preferably substantially centrally, and wherein preferably in each case one of the at least two upper openings is arranged on in each case one of the two parts of the transverse wall, and/or wherein preferably in each case one of the at least two lower openings is arranged on in each case one of the two parts of the transverse wall. The partition is accordingly arranged between the first side wall and the second side wall in such a manner that the spacing of the partition from the two side walls is substantially identical. The accessibility to the upper and lower openings is furthermore provided, and therefore said openings can be penetrated by a mounting fastening element. Furthermore, in each case a lower and an upper opening are located on the one side of the partition and in each case a lower and an upper opening are arranged on the other side of the partition. In this case, the one side faces the first side wall and the other side faces the second side wall.

In a particularly preferred embodiment, the partition does not have an opening. The partition can accordingly be designed as a continuous plate.

A preferred embodiment provides a horizontal partition or horizontal partitions which is/are substantially parallel to the upper and/or lower transverse wall and is/are arranged between said transverse walls and is or are arranged substantially orthogonally to the first and/or second side wall. In a variant embodiment of the connecting element without a partition which is arranged parallel to the side walls, the horizontal partition can extend from the first as far as the second side wall. The horizontal partition can be fastened to the side walls in a form-fitting, force-fitting and/or integrally bonded manner. With the partition which is arranged parallel to the side walls, a horizontal partition can extend, for example, from the first side wall as far as the partition. A further horizontal partition is preferably provided in a surface-parallel manner to said horizontal partition, said further horizontal partition extending from the second side wall as far as the partition.

In a further embodiment, two or more horizontal partitions which are spaced apart vertically from one another are provided. Furthermore, the at least one horizontal partition can extend from the first as far as the second side wall, and, furthermore, a partition which is arranged in a substantially surface-parallel manner to the first and/or second side wall can extend between the horizontal partition and one of the transverse walls or between two horizontal partitions. According to a further embodiment, the connecting element has a rear wall which is arranged orthogonally to the first and second side wall and to the upper and lower transverse wall and connects said transverse walls. The rear wall preferably has a flat extent which completely or partially closes an opening defined by the two side walls and two transverse walls.

In a further advantageous refinement of the connecting element, the rear wall does not have any openings. The flat extent of the rear wall can accordingly be of continuous design. The rear wall can optionally also have one or more openings.

In a particularly preferred embodiment of the connecting element, a side of the connecting element that is arranged orthogonally to the first and second side wall and to the upper and lower transverse wall and preferably lying opposite the rear wall, is of open design. This variant embodiment results in the connecting element having a substantially cube-shaped or cuboidal geometry, wherein the geometry has five closed sides or sides provided with openings and an open side. The open side lies opposite the rear wall here.

The substantially cube-shaped or cuboidal geometry which is described here with respect to the first aspect and has side walls and transverse walls arranged substantially orthogonally to one another and optionally a partition and a rear wall also comprises, within the context of this application, such refinements in which the shape is adapted to the annular shape of the partial ring segment or of the tower section and, for example, the side walls are oriented radially. However, on account of the generally significantly larger radius of a partial ring segment or tower section in comparison to the dimensions of the connecting element, these embodiments are also conceivable under the geometries described here.

In a further preferred embodiment, the openings are each arranged spaced apart, preferably uniformly spaced apart, from the edges of the first and/or second side walls and/or upper and/or lower transverse walls. The first and second opening which can be penetrated by a fastening element and/or mounting fastening element and also upper and lower openings which can be penetrated is/are in each case spaced apart here from the edges of the side walls and from the edges of the transverse walls. Said spacing simplifies the fitting of fastening elements and/or mounting fastening elements in and/or at the openings. Furthermore, said spacing can increase the rigidity of the connecting element.

In a particularly preferred embodiment of the connecting element, penetration directions of the openings in the first and second side wall and in the upper and lower transverse wall lie in a common plane, preferably a substantially vertical plane. The penetration directions of the openings in the first and second side wall here form a first direction of extent of said common plane. The penetration directions of the openings in the upper and lower transverse wall here form a second direction of extent of the common plane. A substantially vertical plane is formed by the penetration directions when the penetration directions each run substantially parallel to the surface normals of the surfaces into which the openings are introduced.

The connecting element can comprise different materials or can be composed of said different materials. The connecting element is preferably composed of metallic materials or comprises the latter. It is particularly preferred for the connecting element to comprise steel or to be composed of steel since steel is in particular suitable for the high tensile loads. Furthermore, it is particularly preferred that the connecting element comprises cast materials or is composed thereof. Furthermore, the connecting element can be composed of nonferrous (NF) metals, such as, for example, special alloys, or can comprise same. Furthermore preferably, the connecting element can be composed of plastic or can comprise the latter, wherein plastics having a high tensile strength, for example fiber-reinforced plastics, are particularly preferred. Furthermore, the connecting element can be composed of concrete, in particular high-strength concrete, or can comprise same.

According to a further aspect of the invention, provided is a wind power installation tower section, wherein the tower section comprises at least one first and one second partial ring segment, wherein the two partial ring segments are each designed as a casing segment, and preferably as a concrete element, and butt against each other at at least one substantially vertical joint, characterized in that a recess, into which a connecting element is inserted, in particular a connecting element according to at least one of the previously mentioned embodiments, is arranged in the region of the joint, and wherein, in the region of the joint, in particular in the region of the recess, the first and second partial ring segment in each case has one substantially horizontal fastening anchor, and wherein, in the region of the joint, the connecting element is connected to the at least one substantially horizontal fastening anchor of the first partial ring segment by at least one first fastening element which penetrates an opening in a first side wall of the connecting element, and the connecting element is connected to the at least one substantially horizontal fastening anchor of the second partial ring segment by at least one second fastening element which penetrates an opening in a second side wall of the connecting element.

If two, three or more horizontal fastening anchors are provided on a partial ring segment, said fastening anchors can preferably also be connected to the connecting element with a corresponding number of fastening elements. In this respect, there is also the possibility of providing more than one opening per side wall such that also one opening per side wall is provided for each fastening anchor per partial ring segment. Alternatively, a plurality of fastening elements can also penetrate an individual opening, in particular an oval, slot-shaped or elongate-hole-shaped opening, in order to penetrate in two, three or more horizontal fastening anchors.

The tower section is designed as an annular segment which preferably forms a complete circle and has a height orthogonally to a radius of the ring segment. Furthermore, the ring segment has a wall, wherein an outer circumferential surface and an inner circumferential surface are thereby formed. The tower section furthermore comprises at least one first and one second partial ring segment which, in the event of a total of two partial ring segments, each have, for example, an angular extent of 180 arc degrees. There is furthermore the possibility that the tower section also comprises more than two partial ring segments, wherein the partial ring segments preferably always have an angular extent of 360 arc degrees in total. A division of the tower section into partial ring segments affords in particular the advantage of simplified transport since tower sections having large diameters can no longer be conventionally conveyed on the customary transport routes.

The partial ring segments are preferably each designed as a casing segment, preferably as a concrete element. The preferred concrete element is furthermore preferably designed as a reinforced concrete element, in particular as a reinforced steel concrete element and/or prestressed concrete element. Furthermore, the preferred concrete element is preferably provided in the form of a precast concrete part, and therefore it can be industrially premanufactured.

The partial ring segments butt against each other at at least one substantially vertical joint. The at least one vertical joint here has a preferably and substantially identical vertical dimension as the height of the tower section. In the case of two partial ring segments, each having, for example, an angular extent of 180 arc degrees, the tower section comprises a total of two substantially vertical joints. The number of the joints per tower section accordingly increases with an increasing number of partial ring segments per tower section.

A recess into which a connecting element can be inserted is arranged in the region of the joint. The recess is preferably half arranged in the first partial ring segment adjacent to the joint and half arranged in the second partial ring segment adjacent to the joint. The recess preferably has a geometrical shape which is adapted to the connecting element, wherein the dimensions of the recess are preferably greater than those of the connecting element. A dimension of the recess, in particular in the vertical direction and/or horizontal direction or substantially in the direction of the axial extent of the horizontal fastening anchors, said dimension exceeding the dimensions of the connecting element in each case, preferably at least slightly, is particularly preferred.

The connecting element is preferably designed in accordance with the previously described aspect of the invention. In a further variant embodiment, more than one recess, into which a connecting element can be inserted, are provided at a joint. This is preferred in particular when the tower section has a height which permits and/or necessitates the provision of more than one recess and/or makes this sensible. The recesses at an individual joint are preferably arranged vertically one above another and preferably in each case have a vertical spacing.

In the region of the joint, in particular in the region of the recess, the partial ring segments in each case have a substantially horizontal fastening anchor. The fastening anchors are preferably each embedded in the partial ring segments and are in particular concreted into the partial ring segments. By means of the horizontal orientation of the fastening anchors and the embedding thereof, said fastening anchors have a high strength in particular in a horizontal or axial direction of tension.

The fastening anchors in combination with the connecting element and with fastening elements serve for the connection of two partial ring segments arranged at a joint. For this purpose, the connecting element is connected in the region of the joint to the substantially horizontal fastening anchor of the first partial ring segment by a first fastening element. This connection is produced by the first fastening element penetrating an opening in the first side wall of the connecting element and undergoing a connection with the substantially horizontal fastening anchor.

Furthermore, the connecting element is connected to the substantially horizontal fastening anchor of the second partial ring segment by a second fastening element. This connection is produced by the second fastening element penetrating an opening in the second side wall of the connecting element and undergoing a connection with the substantially horizontal fastening anchor. In the case of three or more partial ring segments, a connection of the partial ring segments as previously described takes place at the joints which are then present.

In a preferred development of the wind power installation tower section, it is provided that, in the region of the joint, in particular in the region of the recess, the first and second partial ring segment in each case has at least two opposite, substantially vertical, fastening anchors, wherein, preferably, in the mounting state in the region of the joint, the connecting element is connected, preferably releasably, to the at least two substantially vertical fastening anchors of the first partial ring segment by at least one first upper and at least one first lower mounting fastening element which respectively penetrate an opening in an upper and a lower transverse wall of the connecting element, and the connecting element is connected, preferably releasably, to the at least two substantially vertical fastening anchors of the second partial ring segment by at least one second upper and at least one second lower mounting fastening element which respectively penetrate an opening in an upper and a lower transverse wall of the connecting element.

If three or more vertical fastening anchors are provided on a partial ring segment, said fastening anchors can preferably also be connected to the connecting element with a corresponding number of fastening elements. In this respect, there is also the possibility of providing more than two openings per transverse wall, and therefore one opening per transverse wall is also provided for each fastening anchor per partial ring segment. Alternatively, a plurality of fastening elements can also penetrate an individual opening, in particular an oval, slot-shaped or elongate-hole-shaped opening, in order to penetrate into two, three or more vertical fastening anchors.

Accordingly, the partial ring segments comprise per joint at least two substantially vertical fastening anchors which are in particular arranged in the region of the recesses. Accordingly, an imaginary axial extension of the substantially vertical fastening anchors preferably runs through a recess. The two substantially vertical fastening anchors of the first partial ring segment are connected, preferably releasably, preferably in the mounting state, to the connecting element by a first upper and a first lower mounting fastening element. For this purpose, the mounting fastening elements respectively penetrate an opening in an upper and in a lower transverse wall of the connecting element and each undergo a connection with a substantially vertical fastening anchor. The two substantially vertical fastening anchors of the first partial ring segment are preferably arranged in a horizontally mirrored manner with respect to each other in such a manner that the lower of the two fastening anchors is accessible from above with a first lower mounting fastening element and the upper of the two fastening anchors is accessible from below with a first upper mounting fastening element.

Furthermore, the connecting element is connected to the two substantially vertical fastening anchors of the second partial ring segment. This connection preferably takes place in a releasable manner and in particular by a second upper and a second lower mounting fastening element. The two substantially vertical fastening anchors of the second partial ring segment are likewise preferably arranged in a horizontally mirrored manner with respect to each other in such a manner that the lower of the two fastening anchors is accessible from above with a first lower mounting fastening element and the upper of the two fastening anchors is accessible from below with a first upper mounting fastening element.

For this purpose, the mounting fastening elements penetrate the openings in the upper and lower transverse wall of the connecting element. In the case of three or more partial ring segments, preferably a connection of the partial ring segments as described previously takes place at each of the plurality of joints which are then present.

After mounting of the wind power installation tower section has taken place, optionally also only after mounting of the entire wind power installation tower or part thereof has taken place, the mounting fastening elements are preferably removed from the vertical fastening anchors, i.e., the connection between the connecting element and the vertical fastening anchors is released again. This preferred embodiment is based on the finding which has already been explained that a connection, in particular a screw connection, has a lower maintenance intensity if it is essentially subjected to a tensile load. In particular, the maintenance intensity is reduced by reducing or avoiding transverse forces and/or shearing forces within said connection in the operating state, and therefore the removal or loosening of the mounting fastening elements from the vertical fastening anchors leads to the effect that the horizontal connection therefore substantially absorbs axial forces and the shearing stress is significantly reduced.

In a further preferred embodiment, it is provided that the fastening anchors are designed as threaded anchors with an internal thread. The internal thread is designed in particular to receive a corresponding counterpart with an external thread. In a particularly preferred embodiment, it is therefore provided that the fastening elements and/or the mounting fastening elements are designed as screws, preferably as hexagon screws. The screws have an external thread which is preferably designed in a manner corresponding to the internal thread of the fastening anchors.

According to a further aspect of the invention, provided is a wind power installation tower comprising a plurality of wind power installation tower sections, which are arranged one above another as intended, according to at least one of the previously described embodiments, wherein the joints of adjacent tower sections are preferably fitted in a manner offset with respect to one another. Offset means that the joins of the joints of two partial ring segments arranged adjacently one above the other are not arranged vertically one above the other. The joints which are arranged offset with respect to each other increase the rigidity of the tower.

According to a further aspect of the invention, provided is a wind power installation comprising a wind power installation tower according to the previously described aspect.

According to a further aspect of the invention, provided is a method for connecting two partial ring segments to form a wind power installation tower section, in particular to form a wind power installation tower section according to at least one of the previously described aspects, comprising the steps of arranging a first and a second partial ring segment, which are each designed as a casing segment, in such a manner that they butt against each other at at least one substantially vertical joint, inserting a connecting element, in particular a connecting element according to at least one of the previously described embodiments, in a recess arranged in the region of the joint, wherein, in the region of the joint, in particular in the region of the recess, the first and second partial ring segment each has at least one substantially horizontal fastening anchor, in the region of the joint, fastening the connecting element with the at least one substantially horizontal fastening anchor of the first partial ring segment by at least one first fastening element which penetrates an opening in a first side wall of the connecting element, and fastening the connecting element with the at least one substantially horizontal fastening anchor of the second partial ring segment by at least one second fastening element which penetrates an opening in a second side wall of the connecting element. In the event of three or more partial ring segments, a connection of the partial ring segments as described previously takes place at the joints which are then present.

If two, three or more horizontal fastening anchors are provided on a partial ring segment, they can preferably also be connected to the connecting element with a corresponding number of fastening elements. In this respect, there is also the possibility of providing more than one opening per side wall, and therefore one opening per side wall is also provided for each fastening anchor per partial ring segment. Alternatively, a plurality of fastening elements can also penetrate an individual opening, in particular an oval, slot-shaped or elongate-hole-shaped opening, in order to penetrate into two, three or more horizontal fastening anchors.

A preferred embodiment of the method provides fastening, preferably in the mounting state, with respectively opposite surfaces of the recess in the region of the joint of an upper and a lower transverse wall of the connecting element.

In a preferred embodiment of the method, in the region of the joint, in particular in the region of the recess, the first and second partial ring segment each has at least two opposite, substantially vertical, fastening anchors, and fastening, preferably in the mounting state, preferably releasably, in the region of the joint of the connecting element according to one of the previously described variant embodiments with the at least two substantially vertical fastening anchors of the first partial ring segment by at least one first upper and at least one first lower mounting fastening element, which mounting fastening elements each penetrate an opening in an upper and a lower transverse wall of the connecting element, and fastening of the connecting element, preferably releasably, with the at least two substantially vertical fastening anchors of the second partial ring segment by at least one second upper and at least one second lower mounting fastening element, which mounting fastening elements each penetrate an opening in an upper and a lower transverse wall of the connecting element.

If three or more vertical fastening anchors are provided on a partial ring segment, said fastening anchors can preferably also be connected to the connecting element with a corresponding number of fastening elements. In this respect, there is also the possibility of providing more than two openings per transverse wall, and therefore one opening per transverse wall is also provided for each fastening anchor per partial ring segment. Alternatively, a plurality of fastening elements can also penetrate an individual opening, in particular an oval, slot-shaped or elongate-hole-shaped opening, in order to penetrate into two, three or more vertical fastening anchors.

In a further preferred embodiment of the method, after the fastening of the respective connecting element with the respective horizontal fastening anchor of the first and second partial ring segment, the fastening of the respective connecting element with the respective two vertical fastening anchors of the first and second partial ring segment is released again. The release preferably takes place after two partial ring segments have been connected to each other, by connection of the fastening elements to the substantially horizontal fastening anchors. Furthermore preferably, the release only takes place when all of the provided tower sections have been arranged and the tower has therefore been finished. Furthermore preferably, the release takes place after the wind power installation has been completely mounted. In the case of three or more partial ring segments, a connection of the partial ring segments as previously described takes place at the joints which are then present.

An alternative to the fastening of the connecting element with the substantially vertical fastening anchors via the mounting fastening elements consists in that, preferably in the mounting state, one, two or more spacing elements, such as insert plates, spacer wedges or similar, are arranged between at least one transverse wall of the connecting element and a surface of the recess that is adjacent to said transverse wall. Said spacing elements are preferably arranged between the two opposite transverse walls of the connecting element and those surfaces of the recess which are in each case adjacent to said transverse walls. In a similar manner as the fastening of the connecting element with the substantially vertical fastening anchors via the mounting fastening elements, forces, such as pushing or shearing forces, can be transmitted via the spacing elements, which is of advantage in particular in the mounting state. Furthermore preferably, after the end of the mounting state, said spacing elements are removed again in order to obtain the desired low maintenance of the connection.

According to a further aspect of the invention, provided is a method for connecting partial ring segments, in particular two partial ring segments arranged adjacent in the longitudinal direction of a tower, comprising arranging a lower and an upper partial ring segment, which are each designed as a casing segment, in such a manner that they butt against each other at at least one substantially horizontal joint, inserting a connecting element, in particular a connecting element according to at least one of the previously described variant embodiments, in a recess arranged in the region of the horizontal joint, wherein, in the region of the horizontal joint, in particular in the region of the recess, the lower and upper partial ring segment each has at least one substantially vertical fastening anchor, in the region of the horizontal joint, fastening of the connecting element with the at least one substantially vertical fastening anchor of the lower partial ring segment by at least one first fastening element which penetrates an opening in a first side wall of the connecting element, and fastening of the connecting element with the at least one substantially vertical fastening anchor of the upper partial ring segment by at least one second fastening element which penetrates an opening in a second side wall of the connecting element.

If two, three or more vertical fastening anchors are provided on a partial ring segment, said fastening anchors can preferably also be connected to the connecting element with a corresponding number of fastening elements. In this respect, there is also the possibility of providing more than two openings per side wall, and therefore one opening per side wall is also provided for each fastening anchor per partial ring segment. Alternatively, a plurality of fastening elements can also penetrate an individual opening, in particular an oval, slot-shaped or elongate-hole-shaped opening, in order to penetrate into two, three or more vertical fastening anchors. This method serves in particular for the connection of two partial ring segments which are arranged adjacent in the longitudinal direction of a tower and are arranged one above the other, and can therefore form a tower, in particular a wind power installation tower, in the vertical direction. Furthermore, this method serves for connecting tower sections, in particular wind power installation tower sections, to one another.

The connection of two partial ring segments which are arranged adjacent in the longitudinal direction of a tower, are arranged one above the other and at at least one substantially horizontal joint, preferably takes place fundamentally analogously to the connection of two partial ring segments which butt against each other at at least one substantially vertical joint, with the difference that the connection and its respective elements are rotated by 90°. Accordingly, the remaining description of the connecting elements and of the connecting method is also applicable to this connection of two partial ring segments, which are arranged adjacent in the longitudinal direction of a tower, with appropriate adaptation of orientations and/or references, such as, for example, horizontally, vertically, top and bottom, etc.

A particularly advantageous modular design can thereby be realized, with which a wind power installation tower can be erected, for example, with structural elements designed as precast concrete parts, in a time-efficient and cost-effective manner in a modular construction. In a particularly advantageous manner, the recesses are designed and arranged in such a manner that identical connecting elements can be used for the horizontal and vertical joints. The individual structural elements can be, for example, of square, trapezoidal or arcuate design, and therefore cross sections of the tower which differ with respect to the longitudinal axis of the wind power installation tower can preferably be produced, for example various polygons or rounded cross sections, even a round cross section. For further advantages, variant embodiments and embodiment details of said further aspects and the possible developments thereof, reference is also made to the previously undertaken description with regard to the corresponding features and developments of the connecting element.

When, in this description, an opening, in particular a first opening and/or a second opening, and/or a horizontal fastening anchor, and/or a vertical fastening anchor, and/or a fastening element and/or a mounting fastening element is or are described, at least one opening, in particular at least one first opening and/or at least one second opening, and/or at least one horizontal fastening anchor, and/or at least one vertical fastening anchor, and/or at least one fastening element and/or at least one mounting fastening element, are therefore also always meant. Similarly, two openings, in particular two upper openings and/or two lower openings, are also always understood in this description as meaning at least two openings, in particular at least two upper openings and/or at least two lower openings.

BRIEF DESCRIPTION OF THE SEVERAL VIEWS OF THE DRAWINGS

Preferred embodiments of the invention will be explained by way of example with reference to the attached drawings, in which.

DETAILED DESCRIPTION

Figure 1:
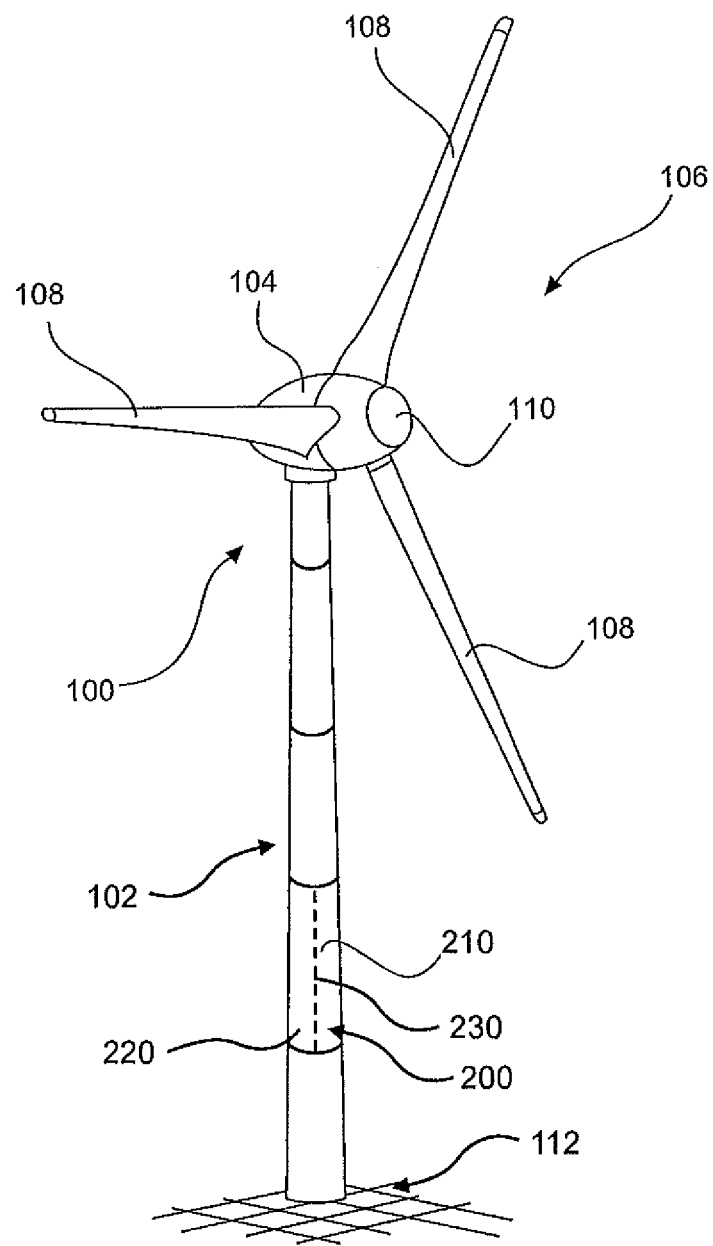
FIG. 1: shows a schematic illustration of a wind power installation.

FIG. 1 shows a schematic illustration of a wind power installation 100. FIG. 1 shows a wind power installation 100 with a tower 102 and a nacelle 104. A rotor 106 with three rotor blades 108 and a spinner 110 is arranged on the nacelle 104. During operation, the rotor 106 is set by the wind into a rotational movement and thereby drives a generator in the nacelle 104. The tower 102 comprises a number of tower sections 200 which essentially consist of a first partial ring segment 210 and a second partial ring segment 220. The partial ring segments butt against each other at a first joint 230 and a second joint 240 (FIG. 3).

Figure 2:
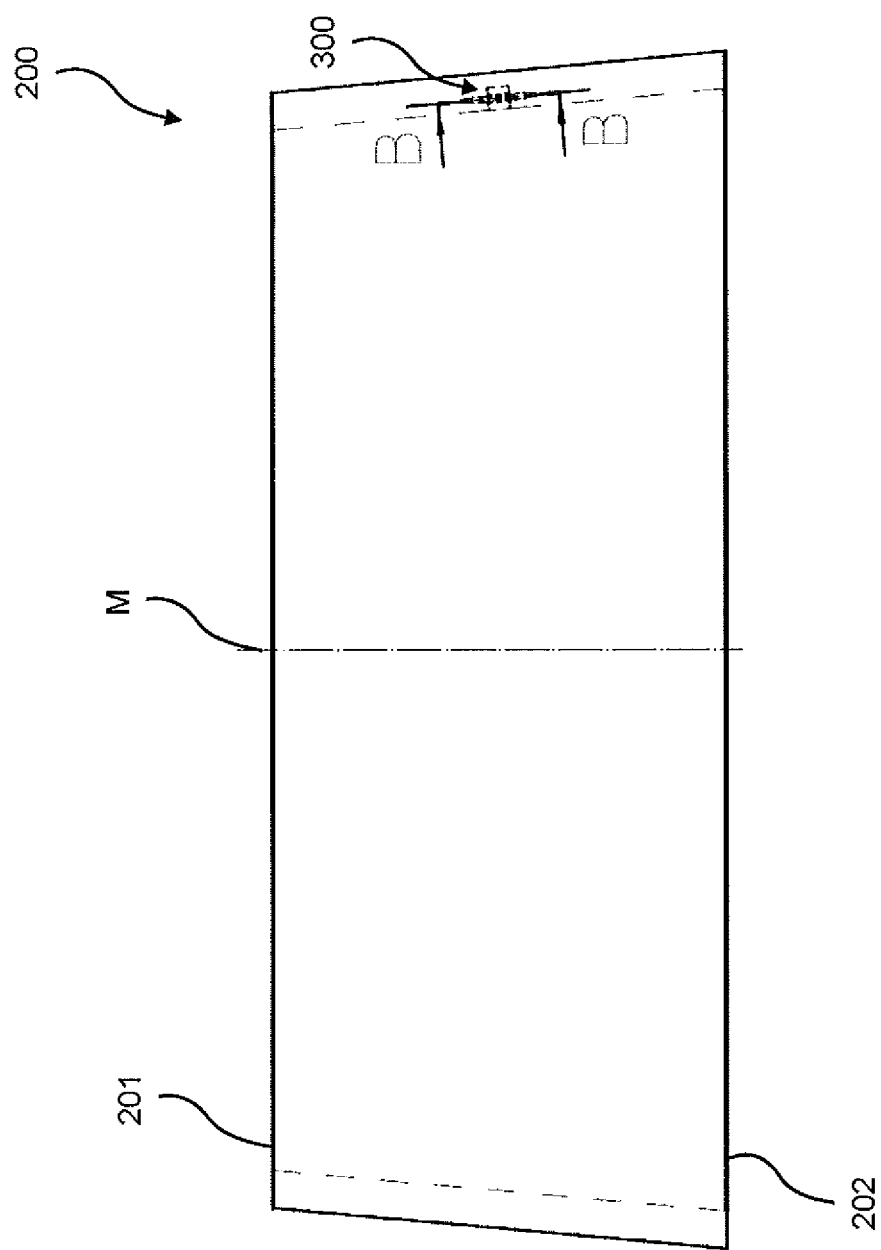
FIG. 2: shows a vertically sectioned side view of a tower section.

FIG. 2 shows a vertically sectioned side view of a tower section 200. The outer shape of the tower 102 is formed in particular by a multiplicity of tower sections 200. The tower sections 200 are assembled one above another at their end surfaces, wherein a lower end surface 202 of a tower section 200 is in each case arranged on an upper end surface 201 of a further adjacent tower section. The tower section 200 furthermore has a round cross section with a center axis M. Since the tower 102 tapers in axial profile from the base 112 to the nacelle 104, the tower sections 200 likewise have a tapering geometry. The diameter at the lower end side 202 is therefore larger than at the upper end side 201. A connecting element 300 according to the invention is arranged in the wall of the tower section 200.

Figure 3:
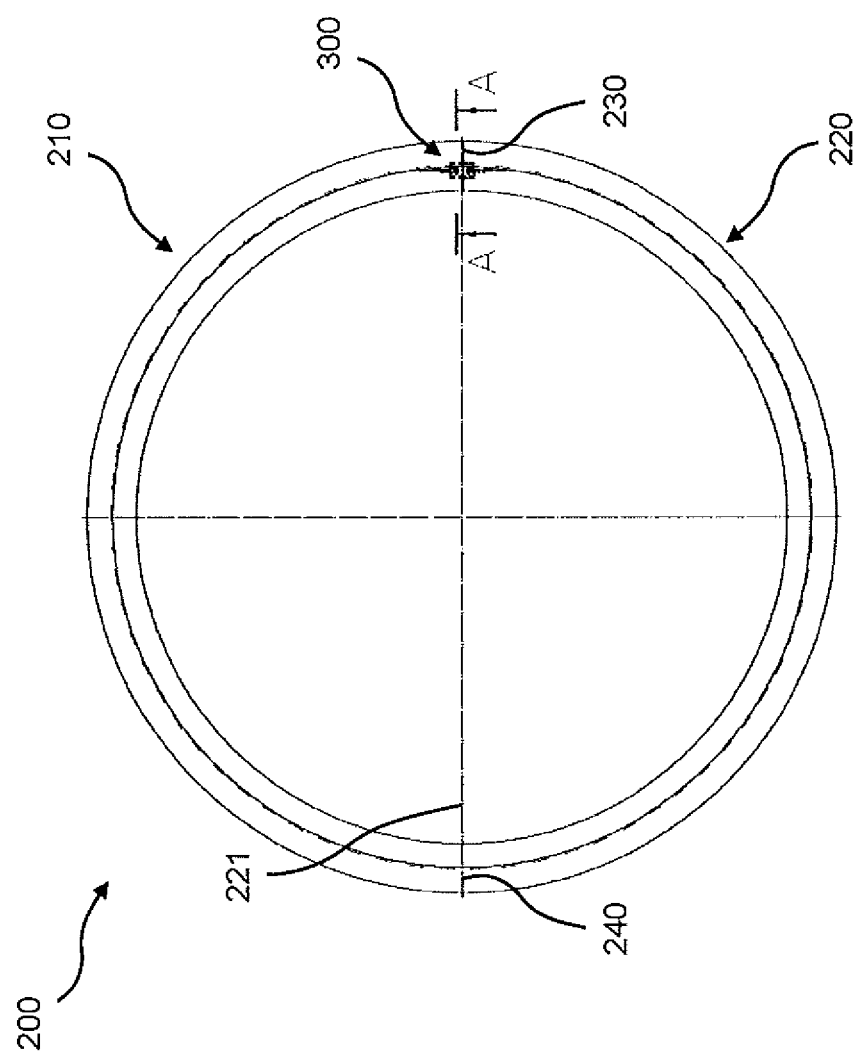
FIG. 3: shows a horizontally sectioned top view of the tower section according to FIG. 2.

FIG. 3 shows a horizontally sectioned top view of the tower section 200 according to FIG. 2, wherein the tower section 200 comprises in particular a first partial ring segment 210 and a second partial ring segment 220. The partial ring segments 210, 220 are mirror-symmetrical with respect to an imaginary straight line 221 which runs from a first joint 230 to a second joint 240. The connecting element 300 according to the disclosure which connects the first partial ring segment 210 and the second partial ring segment 220 to each other is illustrated at the first joint 230.

Figure 4:
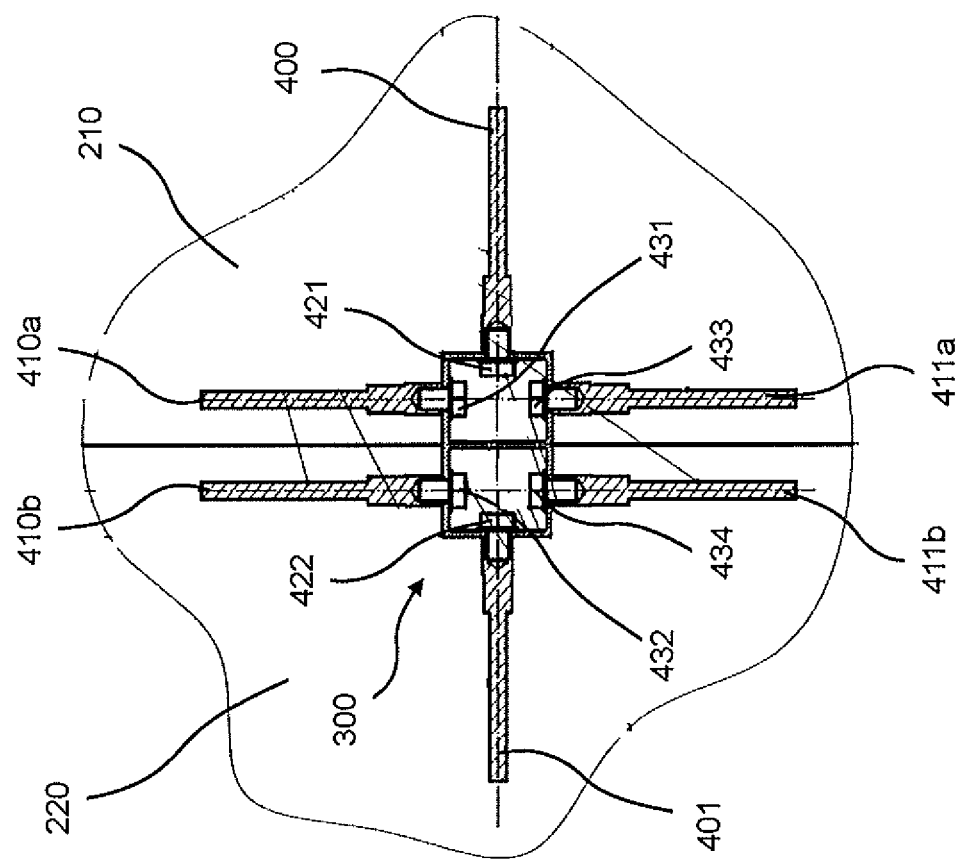
FIG. 4: shows a sectioned view of the inserted connecting element according to the sectional plane B-B of FIG. 2.

FIG. 4 shows a sectioned view of the inserted connecting element 300 according to the sectional plane B-B from FIG. 2 for connecting the first partial ring segment 210 to the second partial ring segment 220. The connecting element 300 is arranged within a recess which is half located in the first partial ring segment 210 and half in the second partial ring segment 220. Furthermore, the connection comprises a first horizontal fastening anchor 400 which is arranged within the wall of the first partial ring segment 210, and a second horizontal fastening anchor 401 which is arranged within the wall of the second partial ring segment 220.

Furthermore, the connection comprises a first upper vertical fastening anchor 410a and a second upper vertical fastening anchor 410b and also a first lower vertical fastening anchor 411a and a second lower vertical fastening anchor 411b. The first upper vertical fastening anchor 410a and the first lower vertical fastening anchor 411a are located in the region of the joint within the wall of the first partial ring segment 210. Furthermore, the second upper vertical fastening anchor 410b and the second lower fastening anchor 411b are arranged in the region of the joint within the wall of the second partial ring segment 220.

Figure 5:
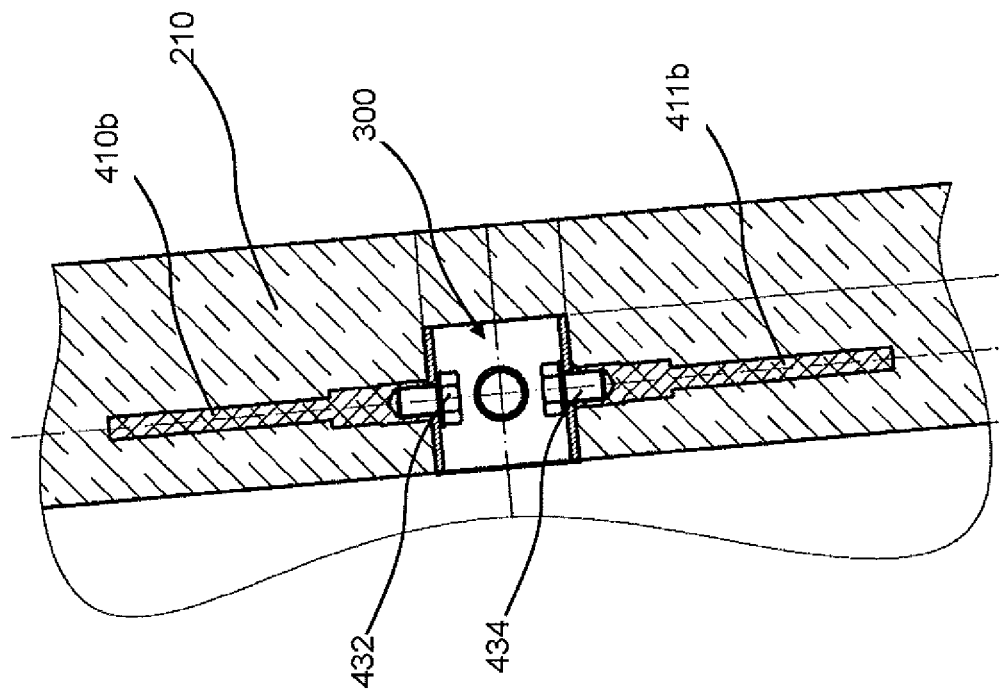
FIG. 5: shows a sectioned view of the inserted connecting element according to the sectional plane A-A from FIG. 3.

FIG. 5 shows a sectioned view of the inserted connecting element 300 according to the sectional plane A-A from FIG. 3. The connecting element 300 is arranged in a recess. Furthermore, the second upper substantially vertical fastening anchor 410b and the second lower substantially vertical fastening anchor 411b are embedded in the wall of the partial ring segment 210.

Figure 6:
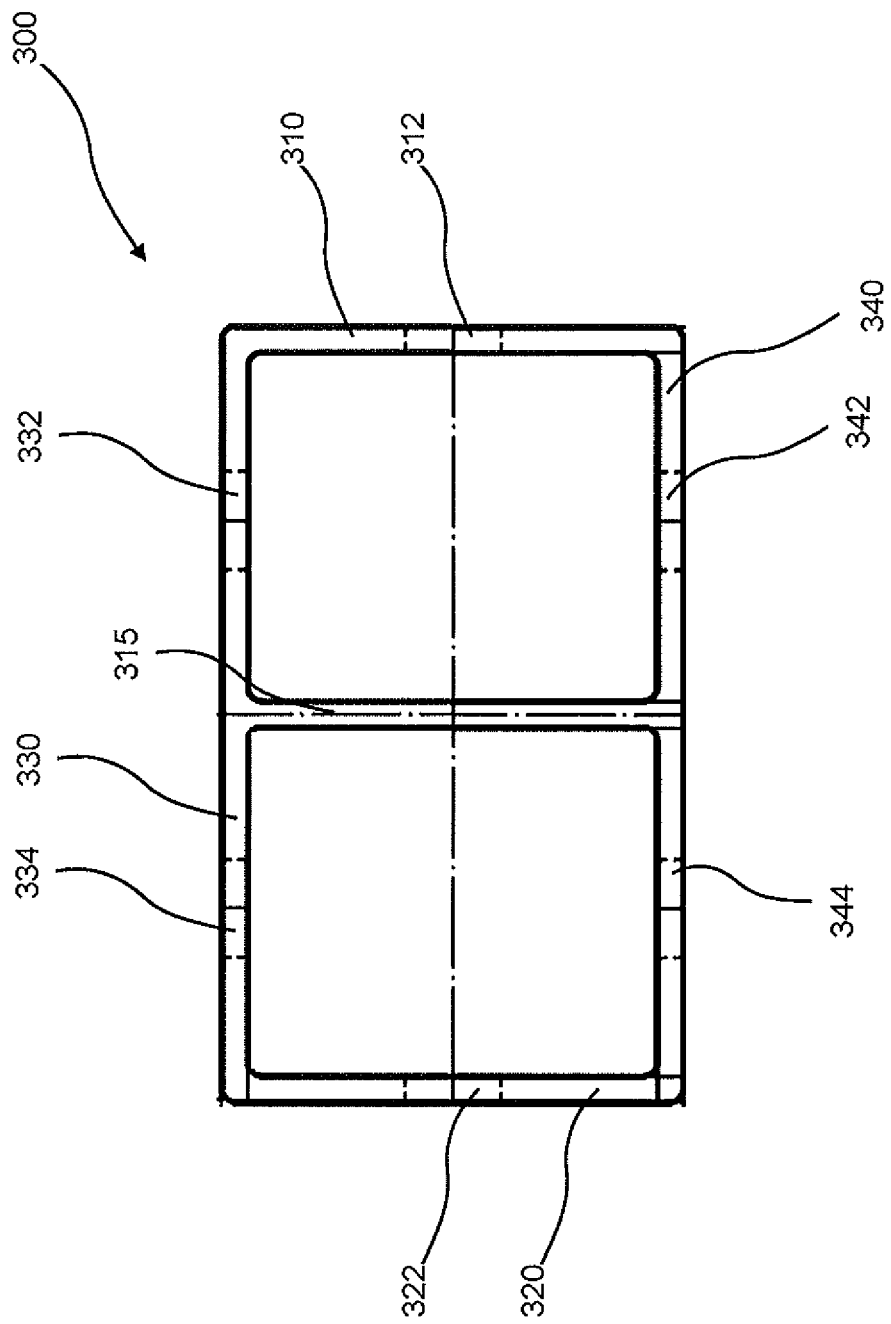
FIG. 6: shows a side view of a connecting element.

FIG. 6 shows a side view of a connecting element 300 with a first side wall 310 and a second side wall 320, which are arranged in a surface-parallel manner, and therefore the surface normals thereof are parallel. The two side walls are connected by an upper transverse wall 330 and a lower transverse wall 340, wherein the upper transverse wall 330 and the lower transverse wall 340 are likewise arranged in a surface-parallel manner. The side walls 310, 320 and the transverse walls 330, 340 each have a flat extent and a constant thickness. A partition 315 is arranged in a surface-parallel manner to the first and to the second side wall 310, 320 and between said side walls and extends from the upper transverse wall 330 toward the lower transverse wall 340.

The first side wall 310 comprises a first opening 312 which can be penetrated by a fastening element. The first opening 312 has a penetration direction which runs parallel to a surface normal of the first side wall 310. The second side wall 320 comprises a second opening 322 which can be penetrated by a fastening element. The second opening 322 has a penetration direction which runs parallel to a surface normal of the second side wall 320. Furthermore, the penetration direction of the first opening 312 is identical to the penetration direction of the second opening 322.

The upper transverse wall 330 comprises a first upper opening 332 and a second upper opening 334, which can be penetrated by a fastening element. The upper transverse wall 330 is divided by the partition 315 into two parts. From the perspective of the partition 315, the first part faces the first side wall 310 and the second part faces the second side wall 320. The two parts have the same dimensions. The first upper opening 332 is arranged in the center of said first part of the upper transverse wall 330 and the second upper opening 334 is arranged in the center of the second part of the upper transverse wall 330. The two upper openings 332, 334 each have a penetration direction which runs parallel to a surface normal of the upper transverse wall 330. The lower transverse wall 340 comprises a first lower opening 342 and a second lower opening 344, which openings can be penetrated by a fastening element. The first lower opening has the same center axis as the first upper opening 332. Furthermore, the second lower opening 344 has the same center axis as the second upper opening 334.

Figure 7:
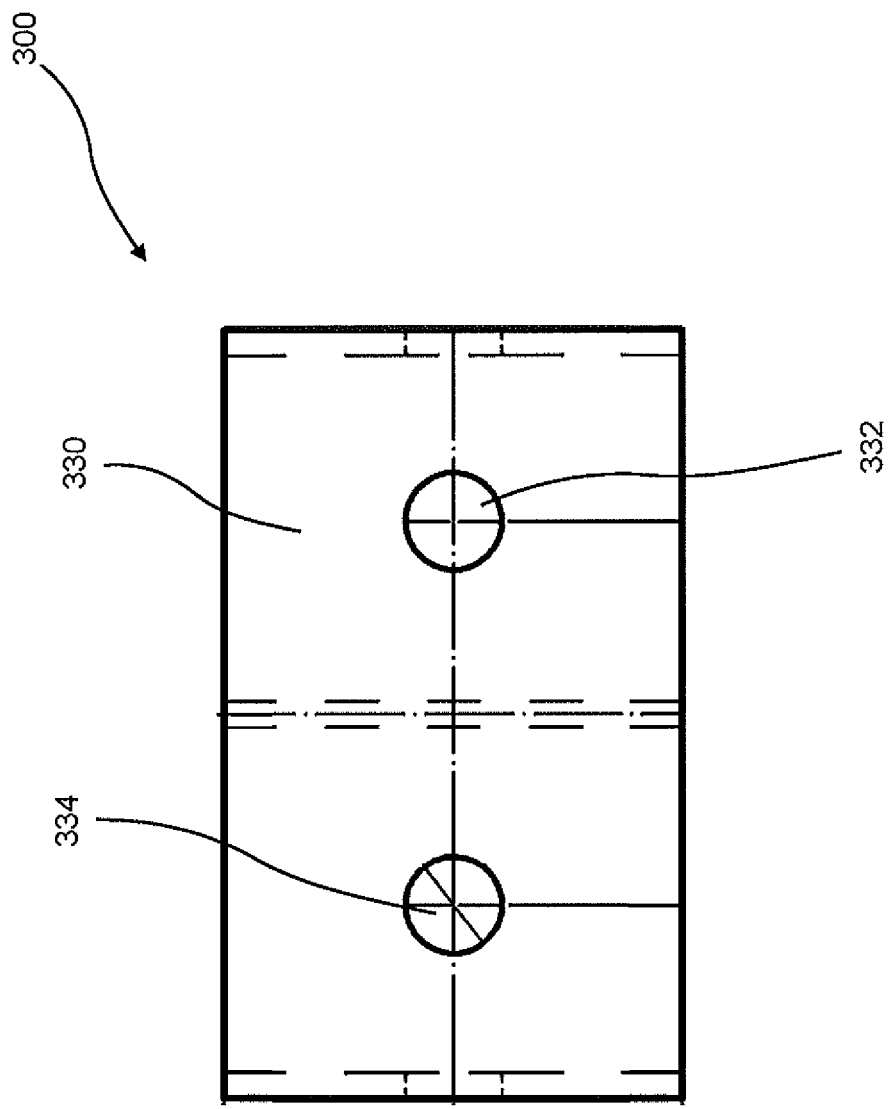
FIG. 7 shows a top view of the connecting element according to FIG. 6.
Figure 8:
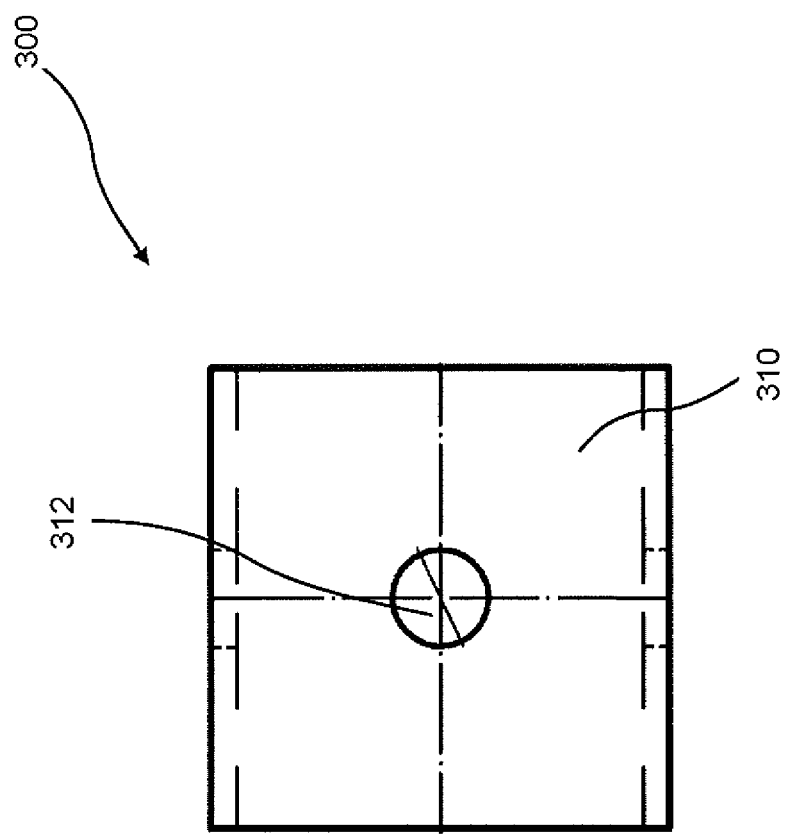
FIG. 8 shows a further side view of the connecting element according to FIG. 6.

FIG. 7 shows a top view of the connecting element 300 according to FIG. 6, wherein the upper transverse wall 330 comprises the previously described first upper opening 332 and the second upper opening 334. FIG. 8 shows a further side view of the connecting element according to FIG. 6, wherein the first side wall 310 comprises the previously described first opening 312.

Figure 9:
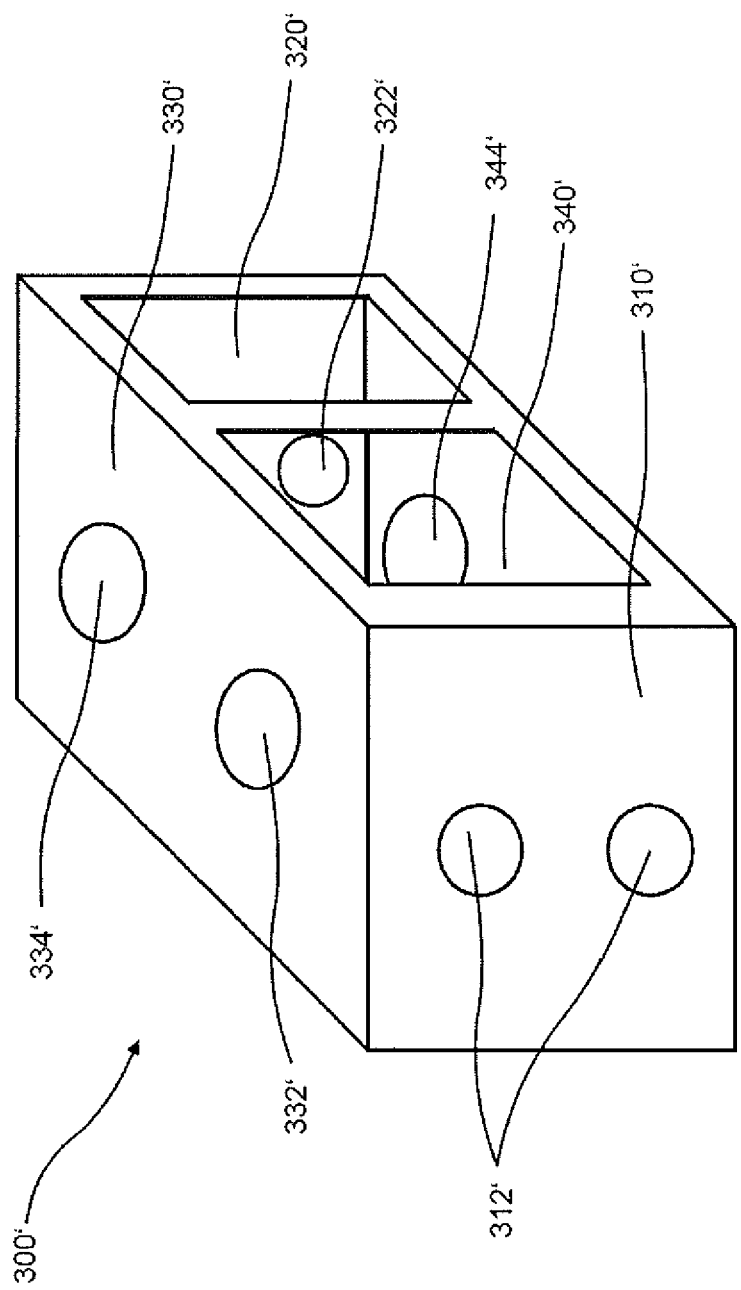
FIG. 9 shows a schematic three-dimensional view of a further embodiment of the connecting element.

FIG. 9 shows a schematic three-dimensional view of a further embodiment of the connecting element 300' with a first side wall 310', a second side wall 320', an upper transverse wall 330' and a lower transverse wall 340', wherein a first upper opening 332' and a second upper opening 334' are likewise arranged here in the upper transverse wall 330'. Furthermore, the lower transverse wall comprises a first lower opening (not illustrated) and a second lower opening 344'. In this exemplary embodiment, the side walls 310', 320' each comprise two openings which are arranged vertically one above the other and can be penetrated by a fastening element. The first side wall 310' comprises two first openings 312' and the second side wall 320' comprises two second openings 322', wherein only the lower of the two second openings 322' is depicted.

The two openings 310, 312, the two upper openings 332, 334 and the two lower openings 342, 344 are designed to be penetrated by a fastening element. The fastening anchors 400, 401, 410a, 410b, 411a, 411b illustrated in particular in FIG. 4 and FIG. 5 are arranged in such a manner that the axis thereof coincides with the center axis in the penetration direction of one of the openings 312, 322, 332, 334, 342, 344. This makes it possible for a fastening element 421, 422 and/or a mounting fastening element 431, 432, 433, 434 to be able to be guided into one of the openings and connected to a fastening anchor adjacent to the opening. In particular by means of the connection of the first horizontal fastening anchor 400 to the connecting element 300 and by means of the connection of the second horizontal fastening anchor 401 to the connecting element 300, the partial ring segment 210 is connected to the second partial ring segment 200.

The connection of the first horizontal fastening anchor 400 to the connecting element 300 takes place by the introduction of a first fastening element 421 into the first opening 312 of the side wall 310 and the subsequent fastening of said first fastening element 421 with the first horizontal fastening anchor 400. Preferably, the first horizontal fastening anchor 400 has an internal thread and the first fastening element 421 is provided with an external thread at one end and with a screw head at its other end. The screw head preferably has a larger cross-sectional area than the first opening 312, and therefore the screw head cannot penetrate the first opening 312. For example, a connection of the first horizontal fastening anchor 400 to the connecting element 300 is therefore possible. This possibility of the connection applies analogously to the connection of the second horizontal fastening anchor 401 to the connecting body 300 by means of a second fastening element 422 by the second fastening element being guided through the second opening 322 in the second side wall 320.

At least for the mounting period, the connecting element 300 is connected to the upper vertical fastening anchors 410a, 410b and lower vertical fastening anchors 411a, 411b by mounting fastening elements 431-434. For this purpose, the first upper mounting fastening element 431 is guided through the first upper opening 332 of the connecting element 300 and connected to the first upper vertical fastening anchor 410a located therebehind. Furthermore, the second upper mounting fastening element 432 is guided through the second upper opening 334 and connected to the second upper vertical fastening anchor 410b located therebehind. The connecting element 300 is analogously connected to the two lower vertical fastening anchors 411a, 411b by the first lower mounting fastening element 433 being guided through the first lower opening 342 and by the second lower mounting fastening element 434 being guided through the second lower opening 344, and by the first lower and the second lower mounting fastening element 433, 434 being respectively connected to the first and second lower vertical fastening anchor 411a, 411b located behind the first and second lower opening 342, 344.

The connections of the connecting element 300 to the vertical fastening anchors 410a, 410b, 411a, 411b by mounting fastening elements 431, 432, 433, 434 is provided in particular for the period of time of the mounting of the wind power installation tower 102 or for the period of time of the mounting of the wind power installation 100. These connections are produced at the beginning of the mounting of the connecting element 300, wherein said connections are produced, depending on the mounting conditions, before or after the production of the connections of the connecting element 300 to the horizontal fastening anchors 400, 401. Furthermore, there is also the possibility of first of all the connections of the connecting element 300 to the fastening anchors of the first partial ring segment 210 being produced followed by the connections of the connecting element 300 to the fastening anchors of the second partial ring segment 220.

The connections of the connecting element 300 to the vertical fastening anchors 410a, 410b, 411a, 411b serve for producing mounting strength during the period of time of the mounting. After the wind power installation tower 102 or the wind power installation 100 is predominantly or completely mounted, the connections of the vertical fastening anchors 410a, 410b, 411a, 411b to the connecting element 300 are preferably completely released again. Alternatively, these connections are not completely, but rather only partially released.

The connecting element 300 firstly has the advantage of simplifying the production of the partial ring segments and the connections thereof and secondly of being itself simple to produce. In particular, however, the production of the connection of the partial ring segments is simple and safe. A further particular advantage consists in that the fastening of two partial ring segments 210, 220 with at least two vertical joints 230, 240 and a substantially horizontally acting connecting force by means of the connecting element 300 has lower maintenance intensity. This therefore results in that the horizontally arranged screw connection is primarily subjected to a tensile load and only small transverse forces in the operating state. Accordingly, the above-described arrangement with vertical connections which are removed or released in the operating state results in a lower maintenance intensity of the screw join.

Figure 10:
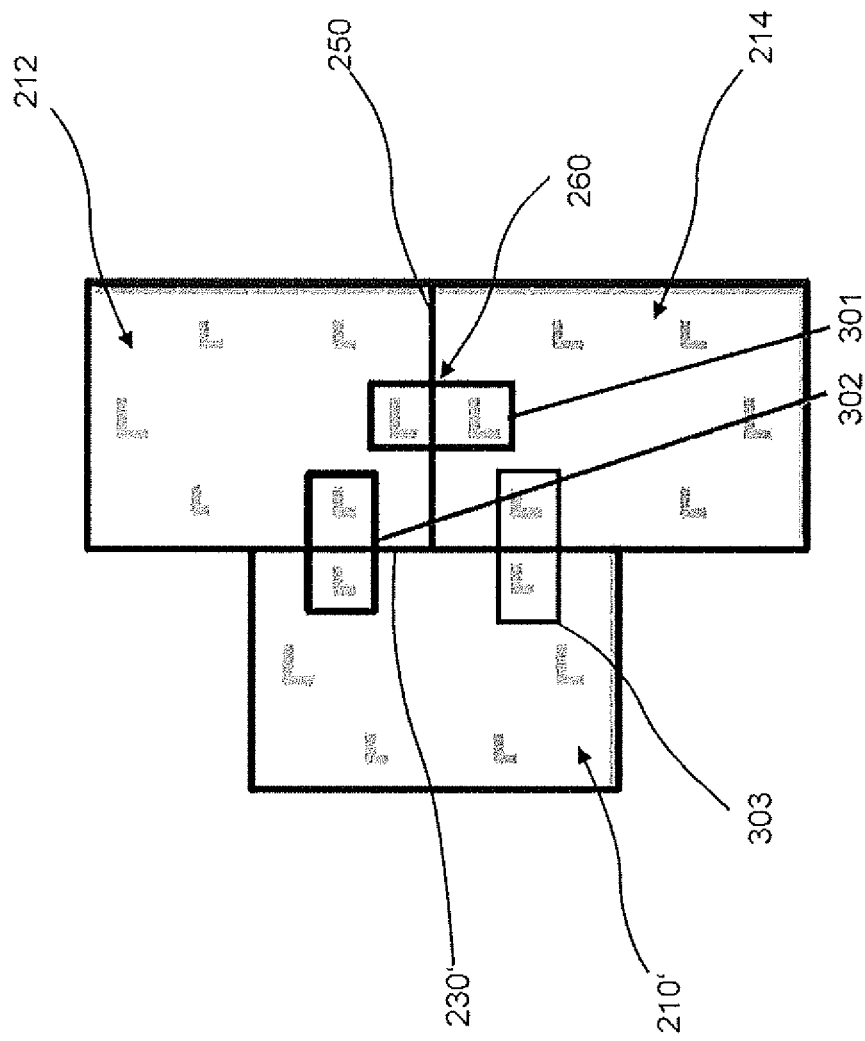
FIG. 10 shows a schematic arrangement of three partial ring segments and the fastening thereof.
Figure 11:
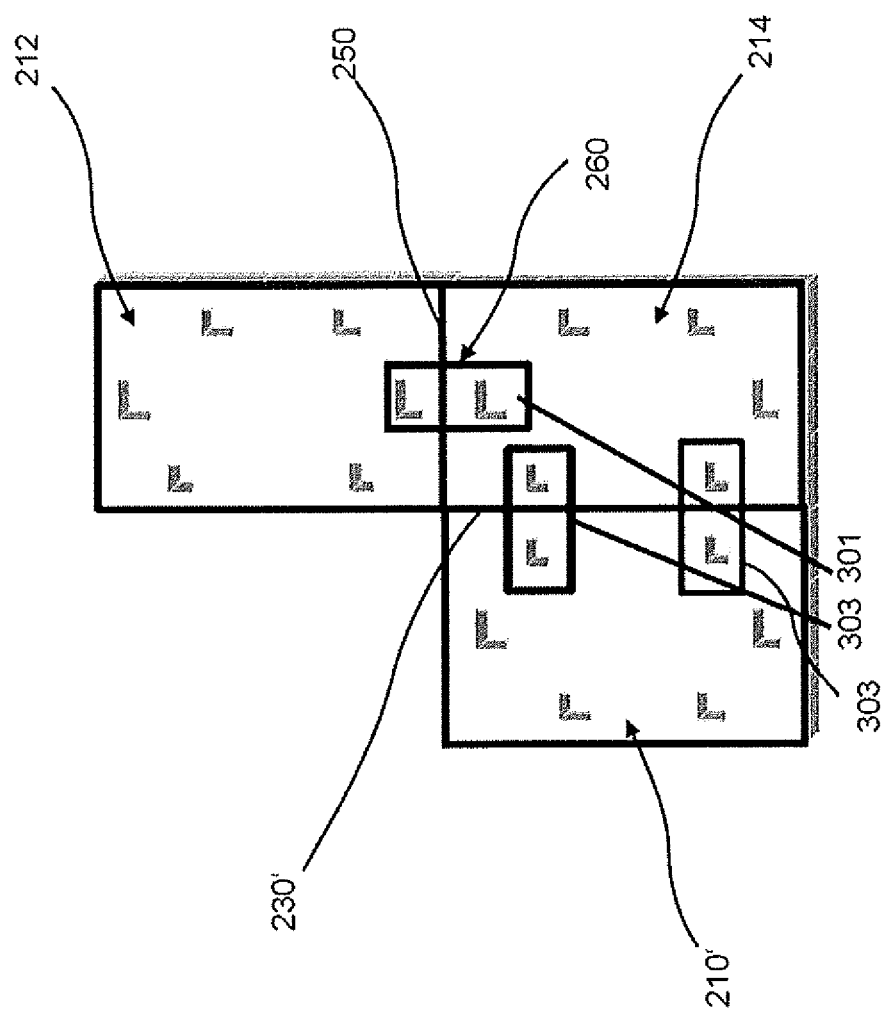
FIG. 11 shows a further schematic arrangement of three partial ring segments and the fastening thereof.

FIG. 10 and FIG. 11 show schematic arrangements of three partial ring segments 210', 212, 214 and the fastening thereof. The upper partial ring segment 212 and the lower partial ring segment 214 are arranged vertically adjacent to each other and therefore form a horizontal joint 250. A recess 260 extends from the upper to the lower partial ring segment 212, 214, wherein a connecting element 301 is arranged in said recess 260. The upper and the lower partial ring segment 212, 214 are connected to each other by means of the connecting element 301. For this purpose, in each case at least one substantially vertical fastening anchor is provided in the upper and lower partial ring segment 212, 214 and is connectable to a fastening element. By means of the introduction of the fastening elements through openings on the side walls of the connecting element 301 and the fastening of the fastening elements to the vertical fastening anchors, a connection, in particular a low-maintenance connection, of the upper and lower partial ring segment 212, 214 takes place.

Furthermore, a first partial ring segment 210' is arranged on the upper and/or lower partial ring segment 212, 214 in such a manner that a vertical first joint 230' is formed. In the exemplary embodiment of FIG. 10, the first partial ring segment 210' is connected to the upper partial ring segment 212 by means of the connecting element 302 and to the lower partial ring segment 214 by means of the connecting element 303. The exemplary embodiment of FIG. 11 shows a connection of the lower partial ring segment 214 to the first partial ring segment 210' by means of two connecting elements 303.

The partial ring segments 210', 212, 214 can preferably be designed as precast concrete parts, and therefore the wind power installation tower can be realized in a particularly time-efficient and cost-effective modular construction. The recesses are preferably arranged and designed in such a manner that identical connecting elements 301, 302, 303 can be used for the horizontal and vertical connections, thus resulting in a particularly efficient design.

Figure 12:
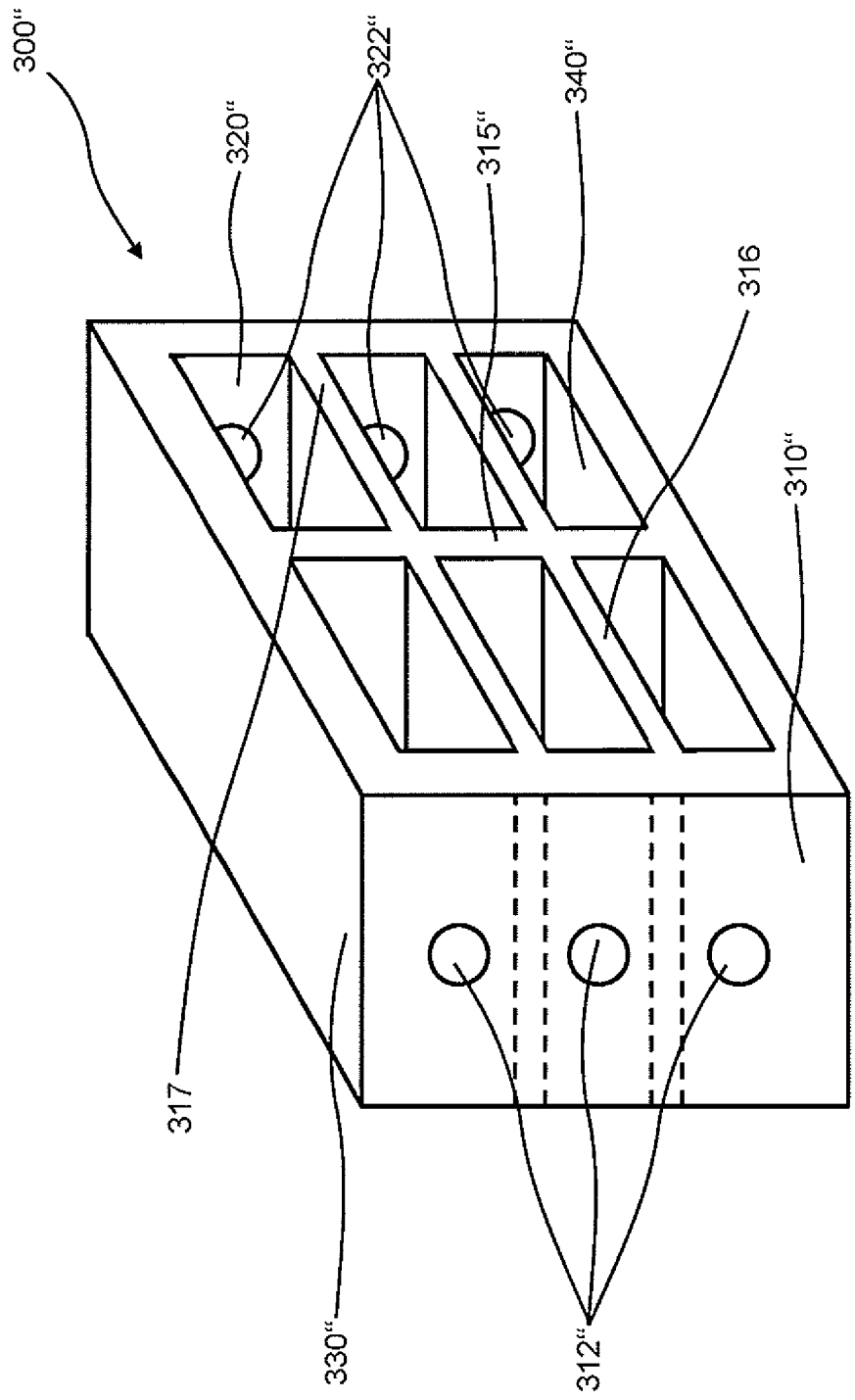
FIG. 12 shows a schematic three-dimensional view of a further embodiment of the connecting element.

FIG. 12 shows a schematic three-dimensional view of a further embodiment of the connecting element. The connecting element 300" differs from the connecting element 300', shown in FIG. 9, in particular in that the connecting element 300" has a first web 316 and a second web 317. The webs 316, 317 are arranged in a substantially surface-parallel manner to the upper and lower transverse wall 330", 340" and extend from the first side wall 310" as far as the second side wall 320". The connecting element 300" has a partition 315" which is arranged in a substantially surface-parallel manner to the first and second side wall 310", 320" and furthermore between the side walls 310", 320". The first side wall 310" has a total of three first openings 312". The second side wall 320" has a total of three second openings 322".

The first opening 312", which has the smallest spacing from the upper transverse wall 330", is arranged in the first side wall 310" at a point which lies between the upper transverse wall 330" and the second web 317. The first opening 312", which has the smallest spacing from the lower transverse wall 340", is arranged in the first side wall 310" at a point which lies between the lower transverse wall 340" and the first web 316. The further first opening 312" is arranged in the first side wall 310" between the first web 316 and the second web 317.

The second opening 322", which has the smallest spacing from the upper transverse wall 330", is arranged in the second side wall 320" at a point which lies between the upper transverse wall 330" and the second web 317. The second opening 322", which has the smallest spacing from the lower transverse wall 340", is arranged in the second side wall 320" at a point which lies between the lower transverse wall 340" and the first web 316. The further second opening 322" is arranged in the second side wall 320" between the first web 316 and the second web 317. The previously mentioned openings of the connecting element 300" are each designed as passage openings.

The number of the first and/or second openings 312, 312', 312", 322, 322', 322" can be increased in further embodiments of the connecting element 300, 300', 300". For example, there is also the possibility of providing two, three or more first and/or second openings 312, 312', 312", 322, 322', 322" in the first and/or second side wall 310, 310', 310", 320, 320', 320". Rows of openings can therefore be provided on the side walls 310, 310', 310", 320, 320', 320". Furthermore, there is the possibility of the openings, in particular the center points thereof, being spaced apart from one another in different directions. For example, there is the possibility for the side walls 310, 310', 310", 320, 320' 320" of the first and/or second openings 312, 312', 312", 322, 322', 322" being spaced apart from one another in the vertical and/or horizontal direction. Said connecting element is suitable, but in particular not exclusively, for the variant in which, preferably in the mounting state, one, two or more spacing elements, such as, for example, insert plates, spacing wedges or similar, are arranged between at least one transverse wall 330", 340" of the connecting element and a surface of the recess 260 that is adjacent to said transverse wall 330", 340".

REFERENCE SIGNS

100 Wind power installation
102 Tower
104 Nacelle
106 Rotor
108 Rotor blades
110 Spinner
112 Base
200 Tower section
201 Upper end surface
202 Lower end surface
210, 210' First partial ring segment
212 Upper partial ring segment
214 Lower partial ring segment
220 Second partial ring segment
221 Joint connecting line
230, 230' First joint
240 Second joint
250 Horizontal joint
260 Recess
300, 300', 300", 301, 302, 303 Connecting element
310, 310', 310" First side wall
312, 312', 312" First opening
315, 315" Partition
316 First web
317 Second web
320, 320', 320" Second side wall
322, 322', 322" Second opening
330, 330', 330" Upper transverse wall
332, 332' First upper opening
334, 334' Second upper opening
340, 340', 340" Lower transverse wall
342 First lower opening
344, 344' Second lower opening
400 First horizontal fastening anchor
401 Second horizontal fastening anchor
410a First upper vertical fastening anchor
410b Second upper vertical fastening anchor
411a First lower vertical fastening anchor
411b Second lower vertical fastening anchor 421 First fastening element
422 Second fastening element
431 First upper mounting fastening element
432 Second upper mounting fastening element
433 First lower mounting fastening element
434 Second lower mounting fastening element
M Center axis

The invention claimed is:

1. A wind power installation tower section comprising:
at least one first partial ring segment and one second partial ring segment, wherein the at least one first and one second partial ring segments butt against each other at at least one substantially vertical joint, and
a recess, wherein a connecting element is inserted in the recess, wherein the connecting element comprises:
a first side wall with at least one first opening configured to receive a fastening element,
a second side wall opposite the first side wall with at least one second opening configured to receive a fastening element,
an upper transverse wall, and
a lower transverse wall opposite the upper transverse wall,
wherein the upper and lower transverse walls are arranged substantially orthogonal to the first and second side walls and connect the first and second side walls together,
wherein, in a region of the at least one substantially vertical joint, each of the at least one first and second partial ring segments has at least one substantially horizontal fastening anchor, and wherein in the region of the at least one substantially vertical joint, the connecting element is connected to the at least one substantially horizontal fastening anchor of the at least one first partial ring segment by at least one first fastening element, wherein the at least one first fastening element penetrates an opening in the first side wall of the connecting element, and the connecting element is connected to the at least one substantially horizontal fastening anchor of the at least one second partial ring segment by at least one second fastening element, wherein the at least one second fastening element penetrates an opening in the second side wall of the connecting element.

2. The wind power installation tower section as claimed in claim 1, wherein the upper transverse wall of the connecting element has at least two upper openings, each configured to receive a respective mounting fastening element, and wherein the lower transverse wall has at least two lower openings, each configured to receive a respective mounting fastening element.

3. The wind power installation tower section as claimed in claim 2, wherein the connecting element further comprises a partition arranged substantially parallel to the first and second side walls, between the first and second side walls, and substantially orthogonally to the lower and upper transverse walls.

4. The wind power installation tower section as claimed in claim 3, wherein the partition divides the upper and lower transverse walls, and wherein one of the at least two upper openings is arranged on one of the upper and lower transverse walls, and wherein one of the at least two lower openings is arranged on one of the upper and lower transverse walls.

5. The wind power installation tower section as claimed in claim 1, wherein the connecting element further comprises a rear wall arranged orthogonally to the first and second side walls and to the upper and lower transverse walls, wherein the rear wall connects the upper and lower transverse walls.

6. The wind power installation tower section as claimed in claim 1, wherein the connecting element further comprises an opening at a side that is arranged orthogonally to the first and second side walls and to the upper and lower transverse walls.

7. The wind power installation tower section as claimed in claim 2, wherein the at least one first opening in the first side wall, the at least one second opening in the second side wall, the at least two upper openings in the upper transverse wall, and the at least two lower openings in the lower transverse wall are each arranged spaced apart from edges of the first or second side walls and upper or lower transverse walls.

8. The wind power installation tower section as claimed in claim 1, wherein the connecting element comprises at least one of steel or concrete.

9. The wind power installation tower section as claimed in claim 1,
wherein, in the region of the at least one substantially vertical joint, each of the at least one first and second partial ring segments has at least two opposite, substantially vertical, fastening anchors, wherein the connecting element is connected to the at least two substantially vertical fastening anchors of the first partial ring segment by at least one first upper and at least one first lower mounting fastening element penetrating respective openings in the upper and the lower transverse wall of the connecting element, and the connecting element is connected to the at least two substantially vertical fastening anchors of the second partial ring segment by at least one second upper and at least one second lower mounting fastening element penetrating respective openings in the upper and the lower transverse wall of the connecting element.

10. The wind power installation tower section as claimed in claim 9,
wherein the fastening anchors are threaded anchors with an internal thread, and
wherein the fastening elements and the mounting fastening elements are screws.

11. A wind power installation tower comprising a plurality of wind power installation tower sections as claimed in claim 1 and arranged one above another, wherein the at least one substantially vertical joints of adjacent tower sections are fitted in a manner offset with respect to one another.

12. A wind power installation comprising the wind power installation tower as claimed in claim 11 and a nacelle.

13. A method for connecting two partial ring segments to form a wind power installation tower section, the method comprising:
arranging a first and a second partial ring segment to butt against each other at at least one substantially vertical joint, wherein a recess is arranged in a region of the at least one substantially vertical joint,
inserting a connecting element in the recess, wherein, in the region of the at least one substantially vertical joint, each of the first and second partial ring segments has at least one substantially horizontal fastening anchor, and
in the region of the at least one substantially vertical joint, fastening the connecting element with the at least one substantially horizontal fastening anchor of the first partial ring segment by at least one first fastening element inserted in an opening in a first side wall of the connecting element, and fastening the connecting element with the at least one substantially horizontal fastening anchor of the second partial ring segment by at least one second fastening element inserted an opening in a second side wall of the connecting element;

in the region of the at least one substantially vertical joint, each of the first and second partial ring segments has at least two opposite, substantially vertical, fastening anchors, and fastening, in the region of the at least one substantially vertical joint of the connecting element with the at least two substantially vertical fastening anchors of the first partial ring segment by at least one first upper and at least one first lower mounting fastening element, wherein the at least one first upper and first lower mounting fastening elements penetrate openings in an upper and a lower transverse wall of the connecting element, and fastening of the connecting element with the at least two substantially vertical fastening anchors of the second partial ring segment by at least one second upper and at least one second lower mounting fastening element, wherein each of the at least one second upper and second lower mounting fastening elements penetrate openings in the upper and the lower transverse wall of the connecting element.

14. The method as claimed in claim 13, comprising fastening, with respectively opposite surfaces of the recess in the region of the at least one substantially vertical joint of the upper and the lower transverse wall of the connecting element.

15. The method as claimed in claim 13, wherein, after the fastening of the respective connecting element with the respective horizontal fastening anchor of the first and second partial ring segment, the fastening of the respective connecting element with the respective two vertical fastening anchors of the first and second partial ring segment is released.

* * * * *